(12) United States Patent
Xhafa et al.

(10) Patent No.: US 10,129,725 B2
(45) Date of Patent: *Nov. 13, 2018

(54) WIRELESS SENSOR NETWORK AND ASSOCIATION REQUEST TRANSMISSION METHOD

(71) Applicant: Texas Instruments Incorporated, Dallas, TX (US)

(72) Inventors: Ariton E. Xhafa, Plano, TX (US); Jianwei Zhou, Allen, TX (US); Arvind Kandhalu Raghu, Dallas, TX (US); Ryan Nuzzaci, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,876

(22) Filed: Mar. 27, 2017

(65) Prior Publication Data

US 2017/0195825 A1    Jul. 6, 2017

Related U.S. Application Data

(63) Continuation of application No. 14/663,270, filed on Mar. 19, 2015, now Pat. No. 9,596,558.

(51) Int. Cl.
| | |
|---|---|
| *H04W 4/00* | (2018.01) |
| *H04W 4/70* | (2018.01) |
| *H04W 74/02* | (2009.01) |
| *H04L 12/44* | (2006.01) |
| *H04L 12/24* | (2006.01) |
| *H04W 48/16* | (2009.01) |
| *H04W 72/04* | (2009.01) |
| *H04W 84/18* | (2009.01) |

(52) U.S. Cl.
CPC ............. *H04W 4/70* (2018.02); *H04L 12/44* (2013.01); *H04L 41/0886* (2013.01); *H04W 48/16* (2013.01); *H04W 72/0446* (2013.01); *H04W 74/02* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 5,894,472 A * | 4/1999 | de Seze | H04W 74/04 370/321 |
| 7,007,107 B1 * | 2/2006 | Ivchenko | H04L 12/4035 709/250 |
| 8,121,050 B2 | 2/2012 | Liu | |
| 9,049,692 B2 | 6/2015 | Nguyen et al. | |
| 2007/0171853 A1 | 7/2007 | Jones et al. | |

(Continued)

OTHER PUBLICATIONS

IEEE 802.5.4e, "Low Rate Wireless Personal Area Networks (LR-WPANs)", Amendment 1: MAC Sublayer, Apr. 2012 (full document provided in the parent case).

*Primary Examiner* — Farah Faroul
(74) *Attorney, Agent, or Firm* — Michelle F. Murray; Charles A. Brill; Frank D. Cimino

(57) ABSTRACT

A method of transmitting association requests in a wireless sensor network includes transmitting an association request from a leaf node to an intermediate node. The method further includes transmitting the association request from the intermediate node during one of either a shared time slot or a dedicated time slot in response to at least one of the timing of dedicated time slots and data collision rates during shared time slots.

20 Claims, 3 Drawing Sheets

(56) References Cited

U.S. PATENT DOCUMENTS

| | | | |
|---|---|---|---|
| 2007/0211686 A1* | 9/2007 | Belcea | H04L 41/00 370/345 |
| 2008/0240048 A1 | 10/2008 | Okker et al. | |
| 2008/0279204 A1* | 11/2008 | Pratt, Jr. | G01D 21/00 370/406 |
| 2009/0046675 A1* | 2/2009 | Pratt, Jr. | H04W 84/18 370/337 |
| 2009/0059814 A1* | 3/2009 | Nixon | H04L 41/12 370/254 |
| 2009/0213816 A1* | 8/2009 | Guo | H04W 72/0446 370/336 |
| 2009/0316628 A1* | 12/2009 | Enns | H04L 12/40006 370/328 |
| 2010/0272092 A1* | 10/2010 | Jeong | H04W 72/005 370/345 |
| 2011/0305142 A1* | 12/2011 | Liu | H04W 48/12 370/241 |
| 2013/0142180 A1 | 6/2013 | Gidlund et al. | |
| 2013/0250928 A1 | 9/2013 | Choi et al. | |
| 2013/0251054 A1 | 9/2013 | Hui et al. | |
| 2014/0064111 A1* | 3/2014 | Viorel | H04W 74/0841 370/252 |
| 2014/0169283 A1* | 6/2014 | Viorel | H04W 74/085 370/329 |
| 2014/0254502 A1* | 9/2014 | Cai | H04W 48/20 370/329 |
| 2014/0254547 A1* | 9/2014 | Yang | H04W 76/15 370/331 |
| 2015/0263785 A1* | 9/2015 | Farrokhi | H04B 3/54 375/257 |
| 2016/0112950 A1 | 4/2016 | Caracas et al. | |
| 2016/0174192 A1 | 6/2016 | Raghu et al. | |

\* cited by examiner

WIRELESS SENSOR NETWORK AND ASSOCIATION REQUEST TRANSMISSION METHOD

This application is a Continuation of application Ser. No. 14/663,270 filed Mar. 19, 2015.

BACKGROUND

Wireless sensor networks (WSNs) include a plurality of spatially distributed intermediate nodes and leaf nodes that transmit data to a central node or a root node by way of the intermediate nodes. Some of the leaf nodes include sensors that monitor physical or environmental conditions, such as temperature, sound, and pressure and transmit data indicative of these parameters through the network to the central node. For example, a WSN can be installed in a forest to detect when a fire has started. Some of the leaf nodes and/or intermediate nodes can be equipped with sensors that measure temperature, humidity, and gases that are produced by fires in trees or vegetation. The measured data is transmitted by way of intermediate nodes to a central node, which transmits the data to a data processor, so that early fire detection is accomplished.

A WSN typically has a plurality of branches wherein a leaf node is the furthest node on a branch from the central node. Before a leaf node can transmit data, it must join the WSN. When a leaf node attempts to join a branch of a WSN, the leaf node monitors beacons transmitted from intermediate nodes to acquire time slot information, so it can transmit an "association request" during a shared time slot. Two types of time slots are used in WSN transmissions, dedicated time slots and shared time slots. Dedicated time slots have channels that are for transmitting data between specific node pairs. A dedicated time slot has a dedicated channel that has been assigned for communications between two nodes during the dedicated time slot. Shared time slots have contention based channels that can be used by any node. During a shared time slot, for the most part, any two nodes may use channels during the shared time slot. A dedicated time slot may be dedicated between two nodes in that the two nodes communicate on a specific channel during that time slot. All association requests are transmitted solely during shared time slots.

Once time slots information is obtained by the leaf node, the leaf node transmits the association request to the intermediate node from which it received the information using a shared time slot. The intermediate node then forwards the association request to a node closer to the root node also using shared time slots. The process continues until the association request reaches the root node. When the root node receives the association request, it processes the request, assigns a dedicated time slot between the leaf node requesting association and its corresponding intermediate node. The root node then includes this information in an association response that it sends to an intermediate node, which forwards the information to other intermediate nodes until the information reaches the leaf node. All the association response data is sent to the leaf node during shared time slots.

Sending association requests during shared time slots is not efficient because the association requests are susceptible to data collisions, which can result in the association requests needing to be retransmitted. Transmitting association requests consumes a great deal of power, so retransmitting association requests reduces the power efficiency of the WSN. As described above, the association requests are transmitted during the shared slots, so some of the intermediate nodes may not be listening during the shared time slots to save power, which can result in further delay of the node association. Moreover, additional association requests are required to be transmitted because the aforementioned nodes are not listening during the shared time slots. The transmission of additional association requests reduces efficiency.

SUMMARY

A method of transmitting association requests in a wireless sensor network includes transmitting an association request from a leaf node to an intermediate node. The method further includes transmitting the association request from the intermediate node during one of either a shared time slot or a dedicated time slot in response to at least one of the timing of dedicated time slots and data collision rates during shared time slots.

BRIEF DESCRIPTION OF THE DRAWL

DETAILED DESCRIPTION

Figure 1:
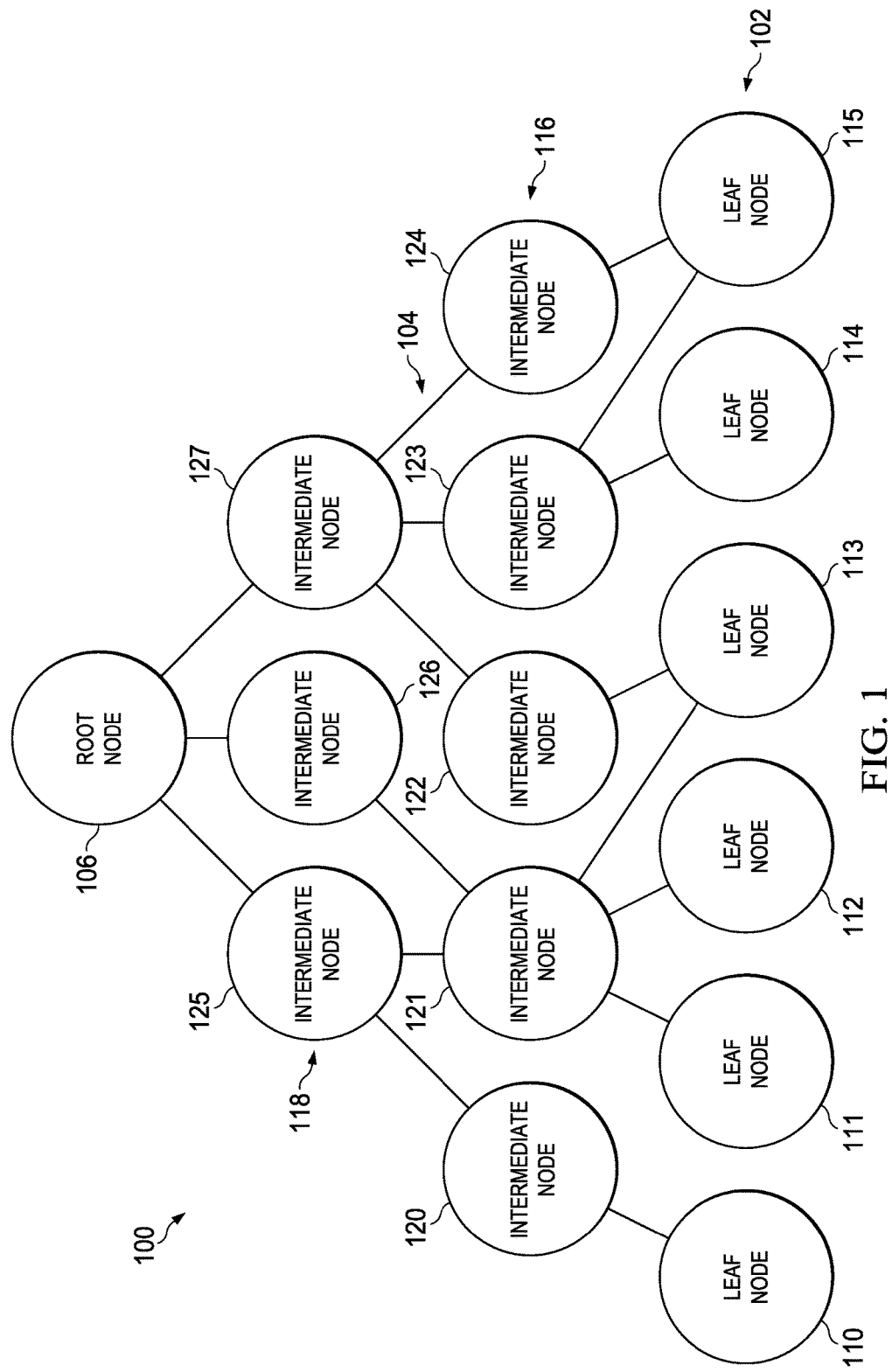
FIG. 1 is a block diagram of an example wireless sensor network (WSN).

FIG. 1 is a block diagram of an example wireless sensor network (WSN) 100. The WSN 100 includes a plurality of leaf nodes 102, a plurality of intermediate nodes 104, and a coordinator or root node 106. The leaf nodes 102 are referenced individually as leaf nodes 110-115. The intermediate nodes 104 described herein include two groups, first intermediate nodes 116 and second intermediate nodes 118. The first intermediate nodes 116 are referenced individually as intermediate nodes 120-124 and the second intermediate nodes 118 are referenced individually as intermediate nodes 125-127. The arrangement of the nodes in the WSN 100 is for illustration purposes only and virtually any arrangement of nodes may be utilized in other WSNs. The WSN 100 facilitates the transmission of data from the leaf nodes 102 to the root node 106 and, in some embodiments, instructions are transmitted from the root node 106 to the individual leaf nodes 102 and/or intermediate nodes 104. For example, the leaf nodes 102 may have sensors coupled thereto that generate data that is to be transmitted to the root node 106. The root node 106 may transmit instructions to the leaf nodes 102 to control their operations, such as their data collection. The WSN 100 facilitates the data transmissions to and from the leaf nodes 102 and the root node 106.

Not all of the leaf nodes 102 are always connected to or associated with the WSN 100. For example, in order to conserve power, the leaf nodes 102 may only connect to the WSN 100 when they have generated data that needs to be transmitted to the root node 106. Accordingly, if leaf node 110 needs to join the WSN 100, it monitors the WSN 100 for a beacon transmitted by one of the intermediate nodes 104 as described in greater detail below. The beacon includes information related to the timing and other information for the leaf node 110 to associate with the WSN 100. Once the leaf node 110 receives the beacon, it transmits an association request to the intermediate node, which in the example of FIG. 1 is the intermediate node 120. The intermediate node 120 transmits the association request to the intermediate node 125, which then transmits the association request to the root node 106. The root node 106 then transmits an association response back to the leaf node 110 by way of the intermediate nodes 120 and 125. The association response contains information regarding future communications between the WSN 100 and the leaf node 110.

Figure 2:
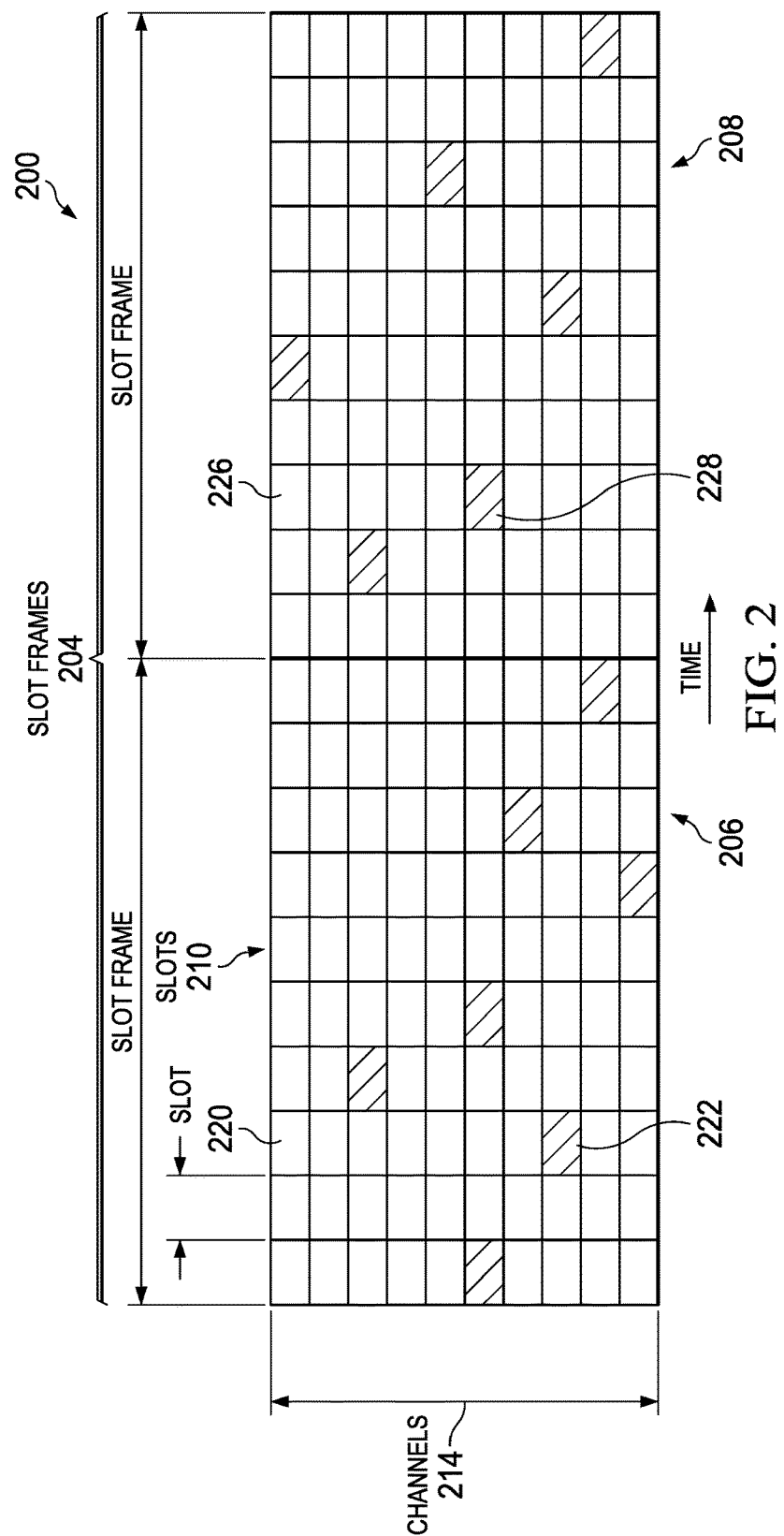
FIG. 2 is a chart that illustrates an example communication protocol for transmitting data in the WSN of FIG. 1.

FIG. 2 is a chart 200 that illustrates an example communication protocol for transmitting data (and association requests) within the WSN 100. The example communication protocol is sometimes referred to a multihop channel system. The multihop channel system described herein consists of a plurality of slot frames 204 extending horizontally in the chart. 200, wherein the horizontal axis represents time. Two individual slot frames 206 and 208 are illustrated in the chart of FIG. 2, however, during communications; the slot frames 204 are continually generated. Each of the slot frames 204 consists of a plurality of time slots (or "slots") 210, which are illustrated as the vertical columns of the chart 200. In some embodiments, the slots are referred to as "links". In the illustrative embodiment of FIG. 2, each of the slot frames 204 has ten slots 210. A plurality of channels 214 are illustrated extending vertically in the chart 200. Each slot 210 may be associated with an individual channel 214 during communications between two specific nodes. Several channels in a single slot may be used for communications between other nodes pairs. For example, a first channel in a slot may be assigned to communications between first and second nodes, a second channel may be assigned to communications between third and fourth nodes, and a third channel may be shared between any nodes.

The root 106 determines the slots and channels for communications between different nodes of the WSN 100, which can change between slot frames 204. For example, a first node and a second node may be assigned slot 3, which is referenced as 220, in the first slot frame 206. The communication assignment further assigns a channel in slot 3 to the nodes, which in the example of FIG. 2 is the third channel and is referenced as 222. During the second slot frame 208, the slot number is the same, which is slot 3 and is referenced as 226; however, communications now occur on channel 5, which is referenced as 228. This allocation of different channels may occur over the plurality of slot frames 204 in the communications protocol. An example of channel hopping between the nodes is shown by the shaded channels of FIG. 2, which change between different slots 210.

Some of the slots 210 are dedicated slots and some of the slots 210 are shared slots. Dedicated slots have specific channels assigned by the root node 106 as being solely for communications between two specific nodes. For example, if the root node 106 assigns channel 222 in slot 220 to communications between nodes 121 and 126, then the slot is dedicated with reference to the nodes 121 and 126. More specifically, nodes 121 and 126 have a dedicated channel in slot 220 in which they can communicate. Shared slots, on the other hand, have channels that are open for use by any node, which makes them susceptible to data collisions when more than one node attempts to transmit. Shared slots may have a dedicated channel between two nodes. However, shared slots also have channels in which any node may communicate, so the slot is considered to be shared among all the nodes. The nodes transmitting during the dedicated slots expect data transmission and stay active to communicate during the active slots. However, during shared slots, the nodes may be in an inactive mode wherein they are not receiving or listening for transmissions in order to preserve power.

The WSN 100 and related embodiments utilize shared and dedicated slots to transmit association requests between intermediate nodes 104 and/or the root node 106, which is unlike conventional WSNs that solely transmit association requests during shared slots. The WSN 100 transmits data and association requests during dedicated slots and, depending on certain criteria, association requests also may be transmitted during shared slots. The WSN 100 and components therein decide whether to transmit association requests during shared or dedicated slots depending on the availability of the different slots and the likelihood of data collisions in shared slots. The decision to transmit during dedicated or shared slots is typically performed by the intermediate nodes 104, but may be performed by the root node 106. The decision may be implemented by a computer program, firmware, hardware, or any other technique that executes the decision processes described herein.

Figure 3:
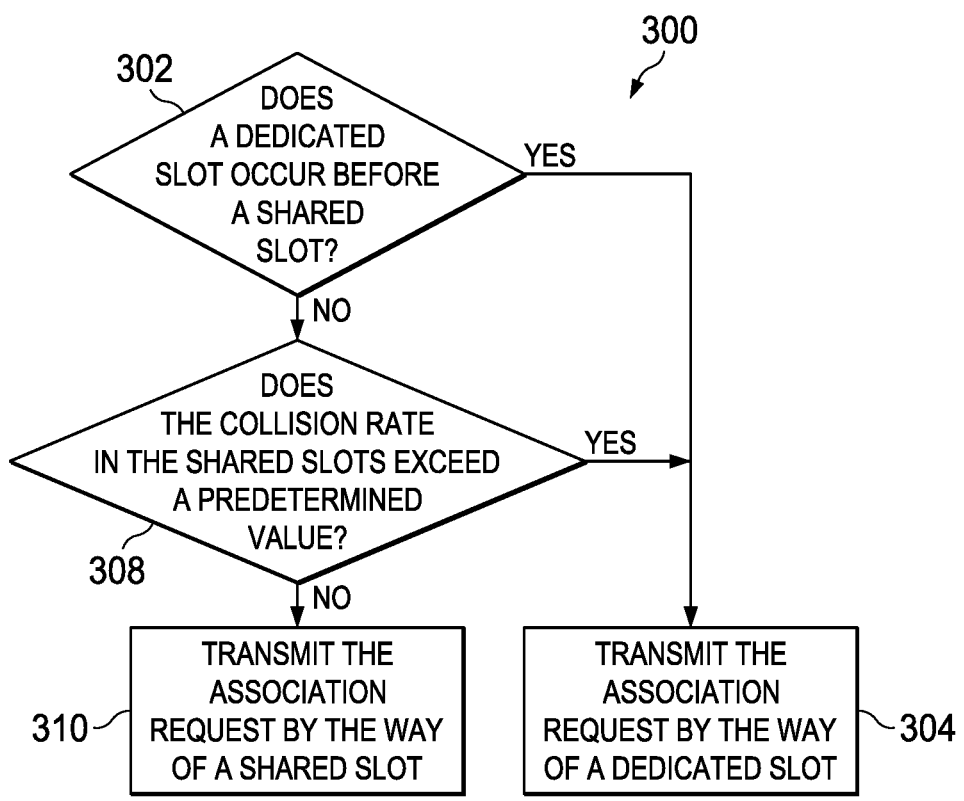
FIG. 3 is a flowchart describing an example of the operation of the WSN of FIG. 1.

The decision to transmit during dedicated or shared slots within the MN 100 is described with reference to FIG. 1, a flowchart 300 of FIG. 3, and by the following example. In the following example, the intermediate node 121 has broadcast a beacon indicating the channels and shared slots during which it can receive association requests from leaf nodes 102. A leaf node 111 has transmitted an association request to the intermediate node 121, which is one of the first intermediate nodes 116, during a shared slot. It is noted that the leaf nodes 102 transmit association requests to the intermediate nodes 104 during shared slots because they have not established dedicated slots during the initial communication. The intermediate node 121 needs to transmit the association request to one of the second intermediate nodes 118, which must then transmit the association request to the root node 106. As shown in FIG. 1, the intermediate node 121 is proximate three leaf nodes 111, 112, and 113, so all of these nodes may be transmitting association requests simultaneously.

The flowchart 300 provides an example of an order for determining whether association requests are to be transmitted during dedicated or shared slots between the intermediate nodes. The order for processing blocks of the flowchart 300 may be changed and does not necessarily have to follow the order set forth in the flowchart 300. In the example of FIG. 3, the decision whether to transmit during a shared or a dedicated slot commences at decision block 302 where a determination is made as to whether a dedicated slot occurs before a shared slot. Referring to FIG. 2, some of the slots 210 are dedicated and some of the slots are shared, so the decision is based on whether a dedicated slot occurs before a shared slot in a slot frame 204. As described above, a dedicated slot means that a slot has a channel dedicated to communications between two specific nodes. A shared slot means that all nodes have the ability to communicate during the slot. The horizontal axis of FIG. 2 represents time, so a slot to the left occurs before slots to the right. It is noted that the dedicated slot must be free meaning that the channel is not assigned to transmit data related to other tasks. If the response to decision block 302 is affirmative, processing proceeds to block 304 where the association request is transmitted during the dedicated slot that has occurred before a shared slot.

In some examples, the data collision rates during the shared slots are monitored. The data collision rates can then be compared to a predetermined value of data collision rates per unit time within a specified recent period. In the example of FIG. 3, this data collision rate is compared to the predetermined value to determine if the data collision rate exceeds the predetermined value at decision block 308 if the result of the decision block 308 is affirmative, processing proceeds to block 304 where the association request is transmitted during a dedicated slot. In some examples, if the data collision rate exceeds the predetermined value, the association requests are transmitted during a dedicated slot irrespective of when shared and dedicated slots occur. Accordingly, in these examples, the decision block 308 occurs before the decision block 302 and the association requests are transmitted during the dedicated slots if the data collision rate during the shared slots is high irrespective of other criteria. In the WSN 100, it is possible that during a period, the data collision rate associated with the node 121 is high due to its possible connections with other leaf nodes 102 as shown, which results in a plurality of association requests needing to be transmitted to other intermediate nodes.

If the result of decision block 308 is negative, then processing proceeds to block 310 where the association request is transmitted during a shared slot. More specifically, if the result of decision block 308 is negative, then the shared slots occur before dedicated slots and the data collision rate in the shared slots is below the predetermined value. In this situation, the association request is transmitted during a shared slot. By transmitting association requests in both shared and dedicated slots, the efficiency of the WSN 100 is improved. For example, in conventional wireless sensor networks, the association requests are sent solely in shared slots between intermediate nodes, which can be very slow and consume excessive power when retransmission of the association requests are required. For example, in some conventional examples, the association requests are transmitted during periods when the data collision rates during shared slots are high. Accordingly, not all of the association requests are successfully transmitted, so they have to be retransmitted.

The criteria set forth above may be applied to all the intermediate nodes 104 in the WSN 100. In the example provided above, the association request is transmitted from the first intermediate node 121 to a second intermediate node 126 based on the above criteria. In another example, the intermediate node 121 may have transmitted the association request to the intermediate node 125. As shown in FIG. 1, the intermediate node 125 is susceptible to data collisions from the intermediate nodes 120 and 121. Accordingly, it may be difficult to transmit the association request during a shared slot, so the above criteria may determine to transmit the association request during a dedicated slot to the root 106.

The root node 106 assigns dedicated slots for transmission of data between the nodes. For example, the root node 106 assigns the transmission criteria between the intermediate nodes 104 and the leaf nodes 102. Additionally, the root node 106 assigns the transmission criteria between the intermediate nodes 104 and the root node 106. With regard to the above example, the root node 106 assigns data transmission criteria between the intermediate node 121 and the leaf node 111 along with transmission criteria between the intermediate nodes 121 and 126. Additionally, the root node 106 may assign transmission criteria between the intermediate node 126 and the root node 106. The assignment is transmitted as an association response and may use the same criteria set forth above. In conventional wireless sensor networks, the association responses are transmitted by way of shared slots, which present the above-described data collision and inefficiency issues. In some aspects of the WSN 100, the association responses are transmitted from the intermediate nodes 104 to the leaf nodes 102 by way of shared slots. However, once the association has been established, future data transmissions may be accomplished by way of dedicated slots.

Referring to FIG. 1, other examples of the transmission of association requests will now be described. In one example, the intermediate node 123 is transmitting an association request from either the leaf node 114 or the leaf node 115 to the intermediate node 127. As shown in FIG. 1, intermediate nodes 122 and 124 may also be communicating with the intermediate node 127. Accordingly, the intermediate node 127 may experience a great number of data collisions during the shared slots. In this example, the data collision information has been communicated to the intermediate node 123. Software, firmware, or the like in the intermediate node 123 determines whether to transmit the association request during a shared slot or a dedicated slot. Referring to the flowchart 300 of FIG. 3, the intermediate node 123 determines if a dedicated slot occurs before a shared slot and, if so, the association request is transmitted during the dedicated slot. If the dedicated slot does not occur before the shared slot, processing proceeds to decision block 308 to determine if the number of data collisions during the shared slot exceeds a predetermined value. As described above, the data collisions rate is high, so processing proceeds to block 310 where the association request is transmitted during a dedicated slot.

In the above example, the decision to transmit during a shared slot or a dedicated slot could have commenced with a decision as described in decision block 308. More specifically, the decision could commence with determining if the data collision rate during the shared slots is high. In this situation, the result of the decision is affirmative, so the processing proceeds immediately to block 304 where the association request is transmitted during a dedicated slot.

In another example, an association request is being transmitted from the intermediate node 121 to the intermediate node 126. Because the intermediate node 126 is only associated with the intermediate node 121, there are likely not enough data collisions during the shared slot to exceed the predetermined value set forth in decision block 308. This data collision information may be transmitted to the intermediate node 121. Referring to decision block 302, a determination is made as to whether the dedicated slot occurs before the shared slot. For purposes of this example, the dedicated slot does not occur before the shared slot, so processing proceeds to decision block 308 where a determination is made as to whether the number of data collisions in the shared slot exceeds the predetermined value. As described above, the data traffic is low, so the number of data collisions during the shared slots is low and processing proceeds to block 310 where the association request is transmitted during a shared slot.

In some embodiments, the decision to transmit association requests further includes analysis as to whether dedicated slots are available. For example, if no dedicated slots are available, the intermediate node may transmit the association requests during a shared slot regardless of the number of data collisions in the shared slots.

While some example wireless sensor networks have been described in detail herein, it is to be understood that the inventive concepts may be otherwise variously embodied and employed and that the appended claims are intended to be construed to include such variations except insofar as limited by the prior art.

What is claimed is:

1. A method of transmitting association requests in a wireless sensor network, the method comprising:

receiving an association request, by an intermediate node;
transmitting the association request from the intermediate node, during either a shared time slot or a dedicated time slot, in response to at least one of:
the timing of the dedicated time slots, or
data collision rates during shared time slots.

2. The method of claim 1, wherein transmitting the association request from the intermediate node is during a dedicated time slot, in response to the dedicated time slot occurring before a shared time slot.

3. The method of claim 1, wherein transmitting the association request from the intermediate node is during a dedicated time slot, in response to the dedicated time slot occurring before a shared time slot irrespective of the number of data collisions occurring during the shared time slot.

4. The method of claim 1, further comprising monitoring data collisions during at least one shared time slot, wherein transmitting the association request from the intermediate node is during a dedicated time slot, in response to the number of data collisions occurring during the at least one shared time slot exceeding a predetermined number during a predetermined period.

5. The method of claim 1, further comprising monitoring data collisions during at least one shared time slot, wherein transmitting the association request from the intermediate node is during a shared time slot in response to:
the number of data collisions occurring during the at least one shared time slot being fewer than a predetermined number during a predetermined period; and
the shared time slot occurs before the dedicated time slot.

6. The method of claim 1, further comprising monitoring data collisions during at least one shared time slot, wherein transmitting the association request from the intermediate node is during a dedicated time slot, in response to:
the number of data collisions occurring during the at least one shared time slot being fewer than a predetermined number during a predetermined period; and
the dedicated time slot occurs before the shared time slot.

7. The method of claim 1, wherein transmitting the association request from the intermediate node comprises transmitting the association request to a root node.

8. The method of claim 1, wherein transmitting the association request from the intermediate node comprises transmitting the association request to a second intermediate node.

9. The method of claim 1, wherein transmitting the association request from a leaf node to the intermediate node comprises transmitting the association request from a leaf node to the intermediate node during a shared time slot.

10. A wireless sensor network comprising:
an intermediate node, configured to:
receive, from a leaf node, an association request; and
transmit, from the intermediate node, during one of either a shared time slot or a dedicated time slot, in response to at least one of:
the timing of the shared and dedicated time slots, or
the data collision rate during the shared time slot.

11. The wireless sensor network of claim 10, wherein the intermediate node is configured to transmit the association request during a dedicated time slot, in response to the dedicated time slot occurring before a shared time slot.

12. The wireless sensor network of claim 10, wherein the intermediate node is configured to transmit the association request during a dedicated time slot, in response to the dedicated time slot occurring before a shared time slot irrespective of the number of data collisions occurring during the shared time slot.

13. The wireless sensor network of claim 10, wherein the intermediate node is further configured to monitor data collisions during at least one shared time slot, and transmit the association request during a dedicated time slot, in response to the number of data collisions occurring during the at least one shared time slot exceeding a predetermined number during a predetermined period.

14. The wireless sensor network of claim 10, wherein the intermediate node is further configured to monitor data collisions in at least one shared time slot, and transmit the association request, in response to:
the number of data collisions occurring during the at least one shared time slot being fewer than a predetermined number during a predetermined period; and
the shared time slot occurring before the dedicated time slot.

15. The wireless sensor network of claim 10, wherein the intermediate node is further configured to monitor data collisions during at least one shared time slot, and transmit the association request during a dedicated time slot, in response to:
the number of data collisions occurring during the at least one shared time slot being fewer than a predetermined number during a predetermined period; and
the dedicated time slot occurring before the shared time slot.

16. The wireless sensor node of claim 10, wherein the intermediate node is configured to transmit the association request to a root node.

17. The wireless sensor node of claim 10, wherein the intermediate node is configured to transmit the association request to a second intermediate node.

18. The wireless sensor node of claim 10, wherein the intermediate node is configured to receive the association request from a leaf node during a shared time slot.

19. A method of transmitting association requests in a wireless sensor network, the method comprising:
transmitting an association request from an intermediate node, during one of either a shared time slot or a dedicated time slot, in response to at least one of:
a timing of dedicated time slots; or
a number of data collision rates occurring during a period of the shared time slot.

20. The method of claim 19, wherein transmitting the association request comprises transmitting the association request during a dedicated time slot, in response to determining that the dedicated time slot occurs before the shared time slot irrespective of the number of data collisions that occur during the shared time slot.

* * * * *